May 21, 1957 J. LINDSTROM 2,792,818
TWO-CYCLE INTERNAL COMBUSTION ENGINE
Filed Jan. 12, 1955
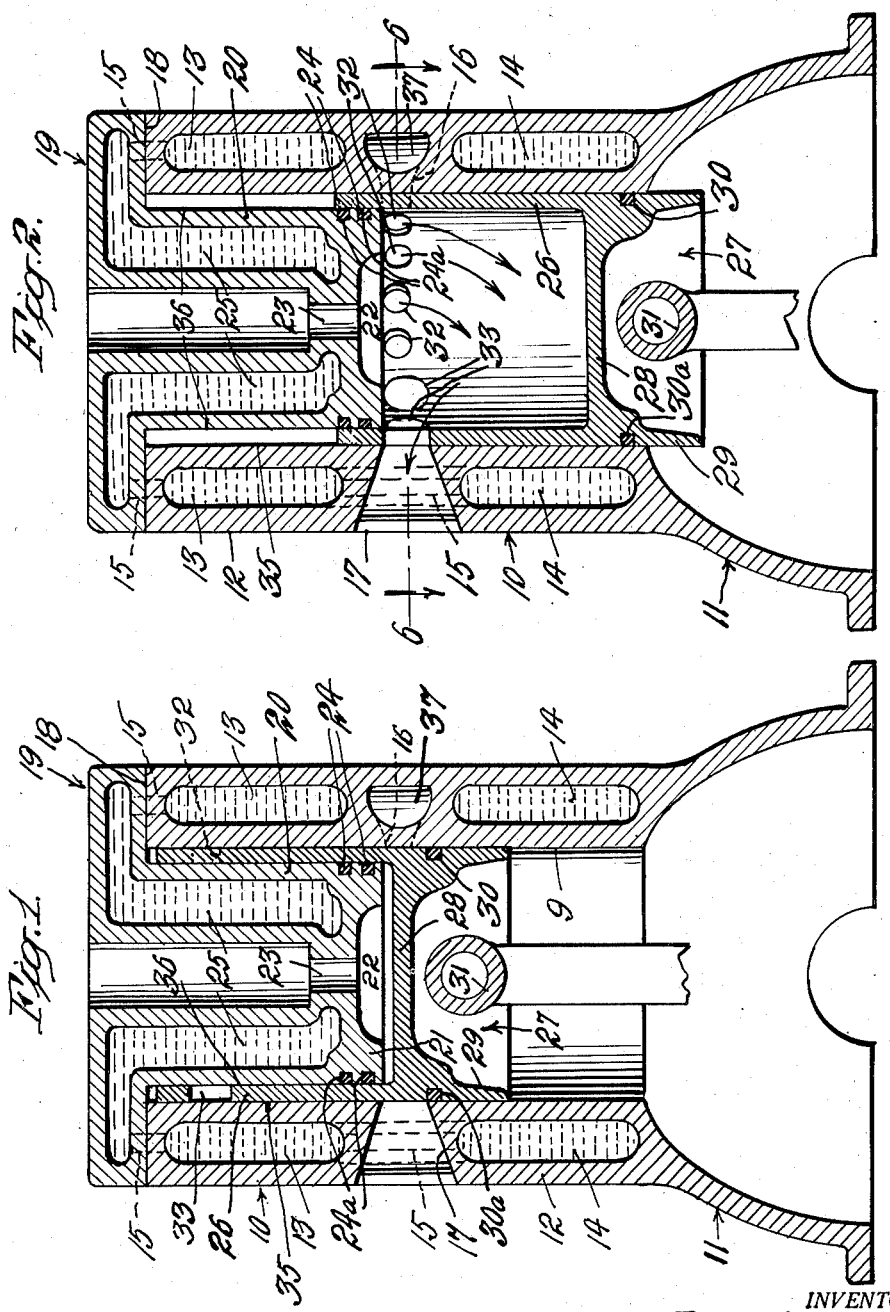
INVENTOR.
JOHN LINDSTROM
BY
Frank A. Bower
ATTORNEY

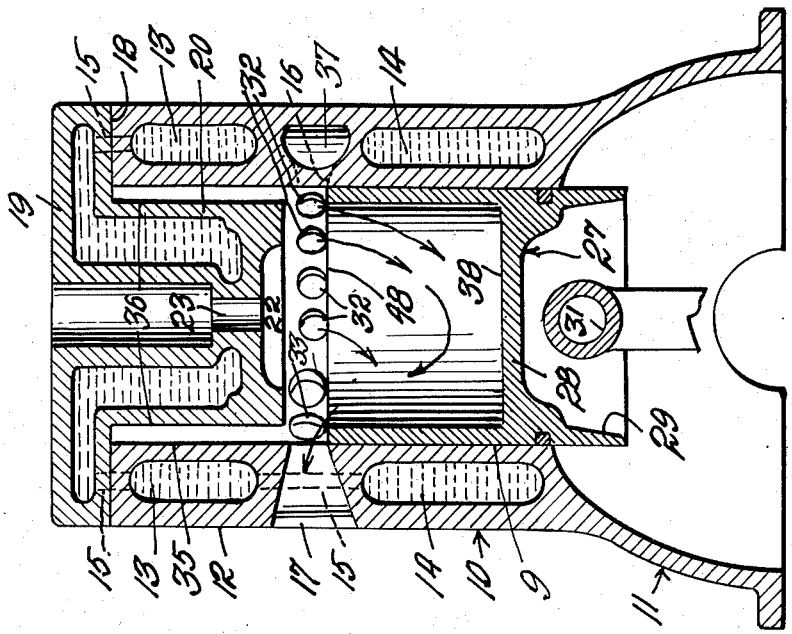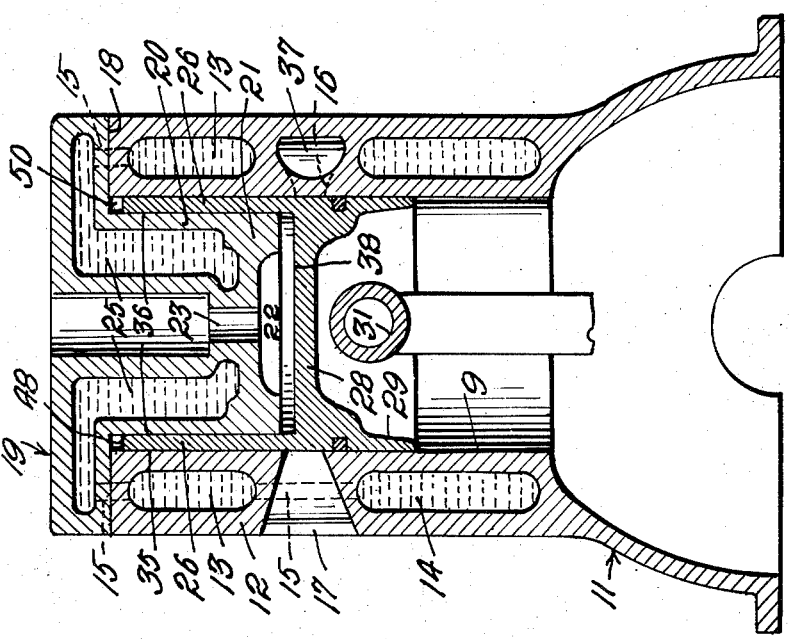

May 21, 1957   J. LINDSTROM   2,792,818
TWO-CYCLE INTERNAL COMBUSTION ENGINE
Filed Jan. 12, 1955
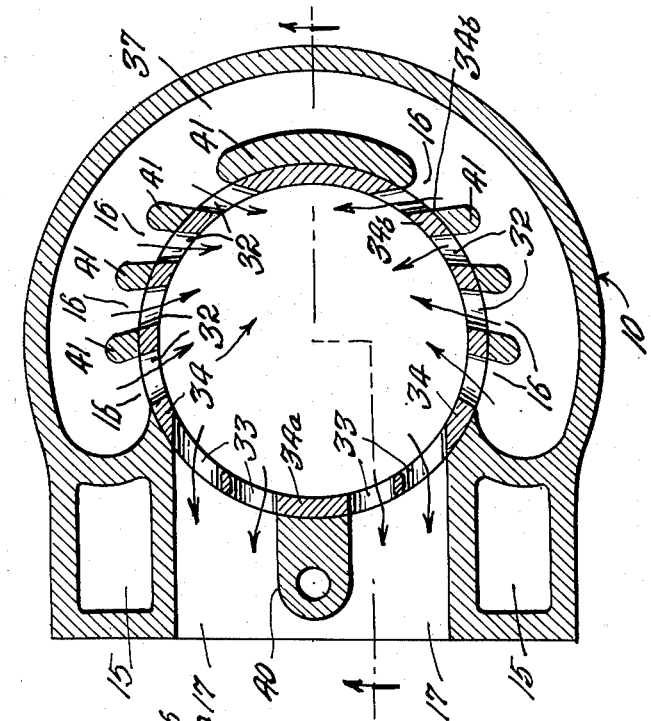
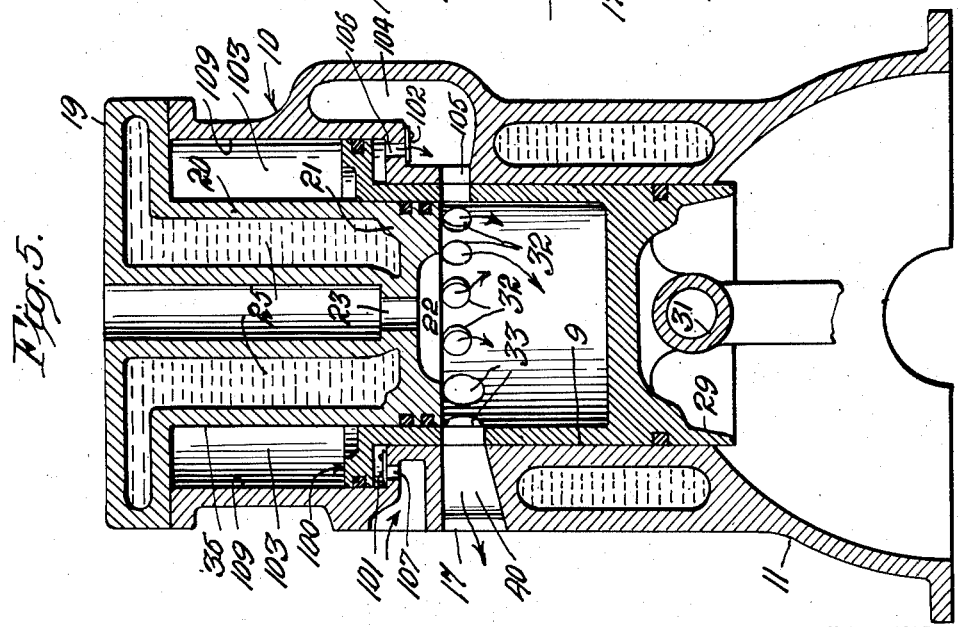
INVENTOR.
JOHN LINDSTROM
BY
Frank A. Bower
ATTORNEY

United States Patent Office 2,792,818
Patented May 21, 1957

2,792,818

TWO-CYCLE INTERNAL COMBUSTION ENGINE

John Lindstrom, Montclair, N. J., assignor to The Viking Tool & Machine Corporation, Belleville, N. J., a corporation of New Jersey Application January 12, 1955, Serial No. 481,337

2 Claims. (Cl. 123—71)

This invention relates to two-cycle engines, more particularly to those types in which both intake and exhaust ports are located on the same end of a cylinder, the opening and closing of the ports being controlled by the edge of a piston reciprocating in the cylinder. The cylinder head in this type of powerplant is of very simple design, containing only openings for either a spark plug, a fuel injector, or both. With the exception of the aforementioned piston there are no other moving parts in the cylinder.

A main object of the invention is a novel combination of engine components attaining improved results in cooperation and performance without sacrifice of the "classical" simplicity of the piston-controlled port scavenged, "valve-less" loop-scavenged or cross-scavenged two-cycle engine.

Another object is to provide a well lubricated crosshead portion for the reciprocating piston without undue loss of lubricating oil through the exhaust ports in an engine with "wet sump" lubrication.

Another object is good accessibility and ease of maintenance for vital parts of the engine.

Another object is the elimination of the cylinder head gasket exposed to combustion chamber pressure and heat.

Another object is an engine which can be advantageously fabricated in light alloy by hard plating appropriate surfaces.

Further objects of the invention particularly in improving the pumping capacity in crankcase compression engines and providing simple pumping means to charge the engine cylinders will appear from the following specification taken in connection with the accompanying drawings, in which Fig. 1 shows a cross-section through an engine embodying the invention with the piston in its top or compression dead center position, the section being taken along line 2—2 of Fig. 6;

Fig. 2 shows the same section but with the piston in its bottom or exhaust center position;

Fig. 3 and Fig. 4 show modifications of the engine shown in Figs. 1 and 2;

Fig. 5 shows the engine as shown in Fig. 2 but with a pumping pistor incorporated; and Fig. 6 is a cross-section on line 6—6 of Fig. 2.

Referring to Figs. 1, 2 and 6, a typical cylinder is shown at 10 and 11 in the crankcase, both being combined in one piece. The cylinder 10 has a bore 9, a water jacket 12 and cooling water spaces 13 and 14, these spaces being connected through a number of holes 15. At 16 midway of the cylinder length is seen an intake port and at 17 an opposite exhaust port. To the top deck 18 of cylinder 10, a head 19 is secured. This cylinder head has a cylindrical piston-like extension 20, reaching into the bore 9, said stationary piston head 20 terminating in crown end 21 in which is formed combustion chamber 22 and an opening 23 for either a spark plug or a fuel injector. At its lower outer periphery, the piston is provided with sealing rings 24 in grooves 24a. The interior of hollow head 20 is formed with chamber 25 through which cooling liquid is circulated for maximum heat dissipation. Telescoped over sealing rings 24 is the tubular extension 26 of reciprocating piston 27 fitted in cylinder bore 9. This piston 27 has a bulk head 28 and a lower apron 29. This lower apron carries a sealing or oil control ring 30 in groove 30a and in contact with cylinder bore 9 and is also provided with transverse wrist pin bore 31 to receive a wrist pin of a connecting rod (not shown) to which the piston 27 is fastened in the conventional manner. It will be noted that the only sealing means in contact with the combustion flame in the chamber 22 are the piston rings 24 while the design eliminates all other gaskets exposed to the hot gases. The piston rings 24, being in a stationary structure 20, are not subjected to dynamic forces tending to cause ring flutter and therefore rapid wear of both rings and ring groove in contrast to conditions in the conventional reciprocating piston. In the latter case, matters are aggravated by excessive temperatures in the region of the piston ring zone causing softening of the ring groove lands and therefore accelerated wear especially if the piston material is aluminum. In the invention, this excessive heat accumulation is eliminated by liquid cooling adaptable in a very simple manner because the piston head 20 is stationary.

The only ring subject to dynamic forces is the control ring 30. However, the very low weight of this type of ring, as embodied in the invention, the complete absence of exposure to hot gases under high pressures and the abundance of lubrication render this setup immune from premature failure.

It will be noted that the lower apron extension 29 of piston 27 forms a crosshead to take the side thrust against bore 9 of cylinder 10. No part of this crosshead during its up and down motions transgresses either the intake or exhaust port region at cylinder bore 9. Therefore, the faces of the crosshead can be freely lubricated without fear of losing lubricating oil through the ports wiped off the crosshead faces by the port edges as in the case in the conventional piston as used in current two-cycle engines resulting in scored and stuck pistons.

Towards its upper end, the tubular extension 26 of piston 27 has inlet ports 32 and exhaust ports 33. The cross-section shown in Fig. 6 indicates the disposition and formations of these ports grouped around the circumference of tubular extension 26. The port arrangement as shown is of the type commonly known as Schnuerle loop scavenging system, but any intake and exhaust port system may be employed known in this general category, i. e., where both intake and exhaust ports are arranged near one end of the cylinder and the gases at the opposite side of the cylinder have, in their path from the intake to the exhaust ports, to describe a loop distributing the intake in the combustion chamber. This loop in the subject invention is formed in the cylinder end which is close to the crankcase; whereas, in the conventional engine, the loop is formed in the cylinder end close to the cylinder head.

In between the exhaust 33 and intake ports 32 are bridges 34, and separating the exhaust into four ports 33 are bridges 34a. Partition 40 separates the exhaust 17 into two passages. The bridges 34b form the intake into a series of orfices 32 directed as shown in cooperation with partitions 41 of the cylinder 10. The bridges 34, 34, 34a near the exhaust ports, being in the path of the outgoing flame, would assume an unduly high temperature unless effectively cooled. This cooling is accomplished by telescoping the tubular extension 26 in between liquid cooled wall 35 of cylinder 10 and liquid cooled wall 36 of cylinder head 20. The lubrication of the inside and outside surfaces of extension 26 can be metered and can be very scant because of the absence of side thrust on these walls, all the side loads being taken in the cooler regions of crosshead 29 and lower cylinder bore 9, both abundantly lubricated.

Referring to Figs. 2 and 6 where the working piston has moved to its lower or outer position, the intake ports 32 and exhaust ports 33 of the piston are fully open, the arrows indicating the approximate path of the gases in through the inlet ports 16 and out through exhaust ports 17.

Figs. 3 and 4 show the engine of Figs. 1 and 2 but with the sealing rings 24 on the inner stationary piston structure omitted.

Sealing of combustion chamber 22 against the atmosphere is accomplished by a high compression chamber 50 which is formed between the top of extension 26 and cylinder 19. The volume of chamber 50 is such in proportion to the stroke and movement of extension 26 so as to result in a compression ratio of about 30:1. This makes it easy to maintain a compression pressure considerably higher than the explosion pressure in combustion chamber 22 thereby effectively sealing it. In operation the manifold 37 supplies the intake gases to the distributed inlet openings 16, 32 as these openings move into register. The diversion into the combustion chamber as the piston head surface 38 moves outward will in general follow the pattern indicated by the arrows to give effective replacement and scavenging as the exhaust gases pass out through openings 33, 17 into any desired exhaust discharge or manifold. It is understood that any desired formation of the intake and exhaust passages may be adopted attaining the thorough efficient charge and discharge of the combustion chamber at each stroke. The passages themselves may be oval or rectangular in section and the edges relative to the piston movement will be positioned to most advantageously time the relative junctions of supply and discharge with respect to the compression and explosion of the charge.

Fig. 5 shows the pumping piston 100 incorporated in the engine by flanging of the upper end of the piston extension 26 and the movement of the annular piston 100 in pump chamber 103 between wall 109 of the casing and surface 36 of the stationary piston. The supply of gases to the intake manifold 104 leading to inlet orifices 105 is through openings 106 from pump chamber 103, reed valves 102 being provided to open only when the pump chamber pressure exceeds the manifold pressure. The supply to the pump chamber 103 is through intake orifices 107 controlled by reed valves 101. Inlet reed valves 101 and discharge reed valves 102 govern the charging and discharging of pumping chamber 103 in conventional manner with inlet port belt 104 forming the communication with inlet ports 105.

In spite of its incomparable mechanical simplicity and lowest cost, the market penetration of the conventional two-cycle engine on a horsepower basis has remained only fractional in proportion when compared to poppet valve controlled two-cycle or four-cycle power plants, both more complicated and more expensive.

Some of the main problems to be considered in piston design are piston scorching and burning, piston ring sticking, ring groove wear and piston seizure—all caused by an exhaust flame rushing out from the cylinder at supersonic velocities thereby greatly adding to its searing effect. Steel armor plating the piston edge, oil cooling or water cooling the piston crown and ring land zone by means of telescoping tubing have been resorted to in some engines, but the added complications and costs were not commensurate with the results and not at all applicable to higher speed engines. Other difficulties and curtailment of output are caused by the fact that 90% of the piston has to pass over a cylinder area perforated by intake and exhaust ports located about midway in the cylinder. These perforations make the maintaining of an adequate oil film between cylinder wall and piston, to sustain the piston side thrust, very difficult, particularly at the bridges between the exhaust ports which lie directly in the path of the flame and therefore are extremely hot and dry.

In the present engine these difficulties and objections are met and solved by the inner and outer guidance of the movable piston coupled with complete control of the cooling. Yet all of the effective aspects of the two-cycle engine are fully maintained.

If the invention is applied to the so-called crankcase compression type of engine, a further advantage is gained because the volume displaced by the working piston 27 at its lower side facing the crankcase is larger than the volume displaced by the piston facing the combustion chamber. This increases the charge delivered by the crankcase pump and results in better scavenging, higher horsepower, or both.

Any preferred type of lubricatnig means may be adopted and preferably the annular space above the piston sleeve 26 is closed and not connected to any source of pressure or discharge. In the modification illustrated in Figs. 3 and 4 the piston sleeve 42 in lower dead center clears the intake and discharge openings, the upper end 48 of the piston being below said openings. If desired the lower surface of crown 21 may be formed with a deflector protruding downward in the paths of the entering gas feeding in from intake orifices 32, the bulk head 28 having a corresponding recess to permit full compression closure of the piston as it rises to top dead center.

The cooling jackets may be connected as shown or in any other desired manner and the principle of the invention is not confined specifically to the details described but is intended to cover such modifications thereof as fall within the scope of the appended claims.

I claim:

1. A two-cycle engine comprising a cylinder with an explosion chamber, a cylinder head wall, a stationary piston head within said wall and concentric with said cylinder head wall forming an annular chamber and an annular restricted space, between said annular chamber and said explosion chamber, a reciprocating piston in said explosion chamber, said reciprocating piston having an annular sleeve extending from said reciprocating piston through said annular restricted space into said annular chamber, said sleeve snugly fitting into said annular space to seal the explosion chamber from said annular chamber and having an annular pump piston fitting in said annular chamber, said cylinder having exhaust means along a sector adjacent said annular space and intake means along another sector adjacent said annular space, an outer wall forming a reservoir chamber around and in communication with said intake means for storing a combustible mixture under pressure, said cylinder head wall having intake passages for passing a combustion mixture into said annular chamber and exhaust passages connecting said annular chamber to said reservoir chamber, said pump piston drawing a combustible mixture into said annular chamber and forcing it under pressure into said reservoir chamber to maintain a supply of the mixture under pressure so that the combustible mixture will be forced into said explosion chamber under pressure to further force spent gases out of the explosion chamber.

2. A two cycle engine as claimed in claim 1 wherein said intake means comprises a plurality of ports through said cylinder separated by walls extending outwardly from said explosion chamber and said sleeve has orifices aligning with a respective port to form in combination with said walls a passage to project said compressed combustible mixture into said chamber.

(References on following page)

References Cited in the file of this patent

UNITED STATES PATENTS

| | | |
|---|---|---|
| 1,040,153 | Crothers | Oct. 1, 1912 |
| 1,281,669 | Sawyer | Oct. 15, 1918 |
| 1,360,689 | Sawyer | Nov. 30, 1920 |
| 1,654,156 | Andersen | Dec. 27, 1927 |

FOREIGN PATENTS

| | | |
|---|---|---|
| 29,078 | Great Britain | Dec. 13, 1909 |